United States Patent
Nakajima et al.

(10) Patent No.: US 11,036,402 B2
(45) Date of Patent: Jun. 15, 2021

(54) CONTROL DEVICE, CONTROL METHOD AND RECORDING MEDIUM

(71) Applicant: OMRON Corporation, Kyoto (JP)

(72) Inventors: Kenji Nakajima, Hannan (JP); Satoshi Yamawaki, Ritto (JP); Kentaro Hirao, Osaka (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 16/485,794

(22) PCT Filed: Jan. 30, 2018

(86) PCT No.: PCT/JP2018/002924
§ 371 (c)(1),
(2) Date: Aug. 14, 2019

(87) PCT Pub. No.: WO2018/163665
PCT Pub. Date: Sep. 13, 2018

(65) Prior Publication Data
US 2020/0050377 A1    Feb. 13, 2020

(30) Foreign Application Priority Data

Mar. 6, 2017    (JP) .............................. JP2017-042021

(51) Int. Cl.
*G06F 3/06* (2006.01)
*G05B 23/02* (2006.01)
(Continued)

(52) U.S. Cl.
CPC ....... *G06F 3/0623* (2013.01); *G05B 23/0221* (2013.01); *G06F 3/0653* (2013.01); *G06F 3/0659* (2013.01); *G06F 3/0673* (2013.01)

(58) Field of Classification Search
CPC .... G05B 19/4185; G06F 21/86; G06N 99/005
See application file for complete search history.

(56) References Cited

U.S. PATENT DOCUMENTS 8,060,677 B2    11/2011  Rostan et al.
2014/0324070 A1*  10/2014  Min ...................... A61B 34/30
                                                                        606/130
(Continued)

FOREIGN PATENT DOCUMENTS

EP    1404061    3/2004
EP    1717654    11/2006
(Continued)

OTHER PUBLICATIONS

"International Search Report (Form PCT/ISA/210) of PCT/JP2018/002924," dated Apr. 10, 2018, with English translation thereof, pp. 1-2.

(Continued)

*Primary Examiner* — Getente A Yimer
(74) *Attorney, Agent, or Firm* — JCIPRNET

(57) ABSTRACT

This control device is connected to a master device and controls a drive target on the basis of the content of communication with the master device, and includes a communication unit which periodically transmits to and receives from the master device first information, which is information relating to control of the drive target, and second information, which is information relating to safety; a first processing unit which controls the drive target by processing the first information; a second processing unit which, by processing the second information, performs processing to ensure safety of the drive target; and an abnormality determining unit which determines that an abnormality has occurred if both the first information and the second information have not been processed within a prescribed period.

5 Claims, 4 Drawing Sheets

(51) Int. Cl.
*G05B 19/042* (2006.01)
*H04L 12/403* (2006.01)

(56) References Cited

U.S. PATENT DOCUMENTS

| | | | | |
|---|---|---|---|---|
| 2016/0057722 A1* | 2/2016 | Premy | ............... | H04W 56/0015 |
| | | | | 370/315 |
| 2016/0150537 A1* | 5/2016 | Jung | ....................... | H04W 4/80 |
| | | | | 455/452.1 |
| 2016/0351036 A1* | 12/2016 | Saldin | ..................... | H04W 4/80 |
| 2016/0357176 A1* | 12/2016 | Chand | ................ | G05B 19/0428 |
| 2016/0357177 A1* | 12/2016 | Chand | .................. | G06F 21/567 |

FOREIGN PATENT DOCUMENTS

| | | |
|---|---|---|
| JP | 3748078 | 2/2006 |
| JP | 2010-079494 | 4/2010 |

OTHER PUBLICATIONS

"Written Opinion (Form PCT/ISA/237) of PCT/JP2018/002924," dated Apr. 10, 2018, with English translation thereof, pp. 1-8.
"Search Report of Europe Counterpart Application", dated Dec. 1, 2020, pp. 1-10.

\* cited by examiner

CONTROL DEVICE, CONTROL METHOD AND RECORDING MEDIUM

CROSS-REFERENCE TO RELATED APPLICATION

This application is a 371 application of the International PCT application serial no. PCT/JP2018/002924, filed on Jan. 30, 2018, which claims the priority benefit of Japan Patent Application No. 2017-042021, filed on Mar. 6, 2017. The entirety of each of the abovementioned patent applications is hereby incorporated by reference herein and made a part of this specification.

TECHNICAL FIELD

The invention relates to a control device and a control method.

DESCRIPTION OF RELATED ART

A PLC (programmable logic controller) is used as a control device for controlling a plurality of machines (motors, robots, sensors, etc.) included in a production line or the like. In addition, in a system in which a plurality of control devices is connected, to simplify the system configuration, the technique of performing communication using an existing standard such as Ethernet (registered trademark) has become common. As such a standard, for example, there exists EtherCAT (registered trademark) (Patent Document 1, U.S. Pat. No. 8,060,677).

In EtherCAT, a network-connected master sends a frame to a plurality of slaves, and the plurality of slaves write data to be sent to the master into the received frame on the fly. The communication used at this time includes process data communication and mailbox communication. Process data communication is communication that is periodically performed for all slaves, and mailbox communication is communication that is performed for specific slaves in a non-specific cycle. Data transmitted in the former is referred to as a PDO (process data object), and data transmitted in the latter is referred to as an SDO (service data object).

In the case of performing process data communication (hereinafter referred to as PDO communication), an instruction (e.g., an operation command is a target value) is transmitted from the master to the plurality of slaves (e.g., motor drivers), and an operating status or a sensed value is transmitted from the plurality of slaves to the master.

For example, EtherCAT slaves including motor drivers have a plurality of PDO mappings such as "a PDO mapping that can use the position control and latch function", "a PDO mapping that can use the position control, speed control, torque control, and latch function", and "a PDO mapping that can use the position control, speed control, torque limit, and latch function". Accordingly, it is possible to select an appropriate mapping according to the requirements of application.

In addition, one of the PDO mappings may include the safety function. EtherCAT slaves having the safety function are generally divided into modules (hereinafter referred to as standard parts) that process the PDO used in normal operations and modules (hereinafter referred to as safety parts) that process the PDO specialized in security functions.

By dividing the modules into the standard parts and the safety parts, it is possible to independently implement the process for ensuring security.

Patent Document 1: U.S. Pat. No. 8,060,677

SUMMARY

However, in the conventional control device, it is not possible to stop only one of the standard part and the safety part on the slave side. This is because the communication for the standard part and the communication for the safety part are processed at the same time, and once either one stops, it is deemed as a communication abnormality. Therefore, for example, even in the case where the program of the standard part is to be updated, it is necessary to stop the entire device, including the safety part.

The invention has been made in consideration of the above issue, and provides a control device which achieves both security and convenience.

The control device according to the invention is a control device connected to a master device and performing controls of a drive target based on a content of communication with the master device.

Specifically, the control device includes: a communication unit which periodically transmits and receives, to and from the master device, first information which is information on the controls of the drive target and second information which is information on security; a first processing unit which controls the drive target by processing the first information; a second processing unit which performs processing for ensuring security of the drive target by processing the second information; and an abnormality determining unit which determines that an abnormality has occurred in the case where both the first information and the second information are not processed within a prescribed period.

The invention may be applied to a control system in which a master device and a control device which controls a drive target are connected. The drive target is typically a servomotor or the like, but is not limited thereto. As long as it is a device of a controlled target, it may be one (e.g., a laser device, etc.) that does not have a movable part.

The first information is information on the controls of the drive target. For example, in the case where the control target is a servomotor, the first information includes position information, speed information, torque information, and the like. Moreover, the second information is information on security of the drive target. The second information includes, for example, an STO (safe torque off) command defined on the FSoE (Fail Safe over EtherCAT) protocol, an abnormality flag, and the like. The control device according to the invention performs control processing of the drive target based on the first information and implements processing (e.g., output shut-off, etc.) for ensuring security of the drive target based on the second information.

Further, the control device according to the invention determines that the abnormality has occurred in the case where both the first information and the second information are not processed within the prescribed period. The case where the information is not processed includes the case where the information itself cannot be transmitted as well as the case where a normal processing result is not obtained even if packets and frames are sent out (e.g., the case where information to be updated returns without being updated).

According to such a configuration, it is possible to stop only the unit for controlling the drive target while the process for ensuring security remains implemented. In other words, while security of the device remains secured, maintenance and the like may be performed, and convenience is improved.

Further, the abnormality determining unit may determine that the abnormality has occurred in the case where the first information is not processed within the prescribed period while the drive target is being driven, and may determine that the abnormality has occurred in the case where both the first information and the second information are not processed within the prescribed period while the drive target is not being driven.

Further, the abnormality determining means may determine that the abnormality has occurred in the case where the first information is not processed within the prescribed period while the drive target is being driven, and may determine that the abnormality has occurred in the case where both the first information and the second information are not processed within the prescribed period while the drive target is not being driven.

While the drive target is being driven, it is preferable to perform abnormality determination by limiting the target only to the first information. As a result, in the case where an unintended communication interruption occurs, it is possible to safely stop the drive target.

Further, the first information and the second information may be respectively transmitted and received by independent packets. Moreover, the first information and the second information may be transmitted and received in different cycles.

By transmitting and receiving the first information and the second information respectively by independent packets, it is possible to transmit and receive them respectively in different cycles. As a result, for example, it is possible to separately perform communication for performing control of the drive target at a high frequency, and communication for ensuring security at a low frequency. In addition, resource allocation for communication and processing can be optimized.

Further, a transception cycle of the first information may be shorter than a transception cycle of the second information.

According to such a configuration, it is possible to perform communication for controlling the drive target at a higher frequency. Also, in the case where the communication capacity is limited, it is possible to allocate more information capacity to the first information.

The invention may be specified as a control device including at least a part of the above means. Moreover, it may also be specified as a control method performed by the above control device. The above processes and means may be freely combined and implemented as long as no technical confliction arises.

According to the invention, it is possible to provide a control device which achieves both security and convenience.

BRIEF DESCRIPTION OF THE DRAWINGS

FIGS. 3A, 3B and 3C are views showing PDO communication.

DESCRIPTION OF THE EMBODIMENTS

First Embodiment

<System Configuration>

Hereinafter, preferred embodiments of the invention will be described with reference to the drawings.

Figure 1:
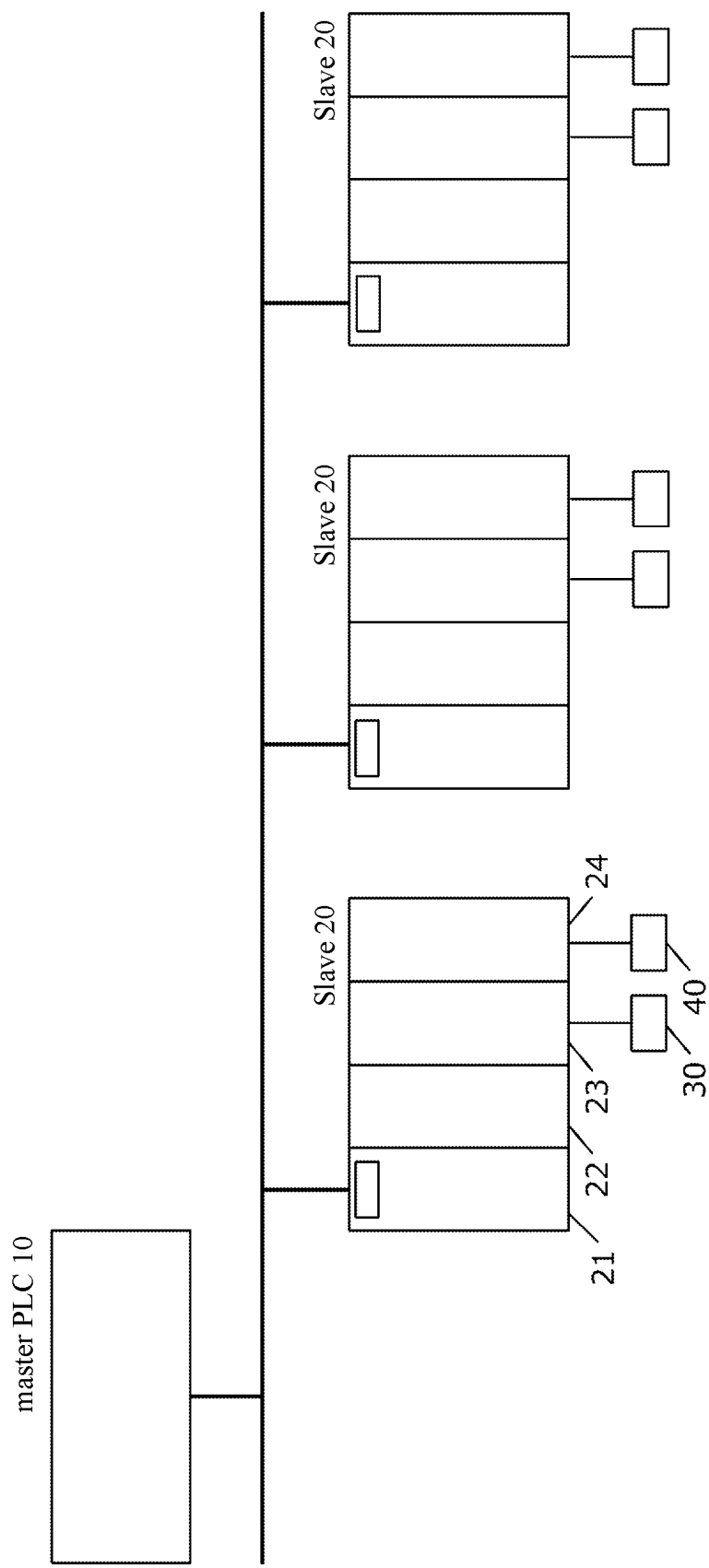
FIG. 1 is a schematic view of a control system according to the first embodiment.

FIG. 1 is a schematic view showing a control system according to the first embodiment. The control system according to the first embodiment is configured to include a master PLC, which is a master node, and a plurality of slaves, which are slave nodes.

The master PLC 10 is a device that controls the plurality of slaves 20. Specifically, management of programs executed by the slaves 20, monitoring of the operating state of the slaves 20, and the like are performed.

The slave 20 is a device that is electrically connected to the master PLC 10, a servomotor 30 and a sensor 40, drives the servomotor 30 according to a command received from the master PLC 10, obtains information on the driving of the servomotor 30 from the sensor 40, and transmits the information to the master PLC 10. Moreover, the slave 20 has a safety controller function.

The slave 20 typically includes a communication unit 21 which performs network communication, a CPU unit 22 which is an entity that executes a program, and an I/O unit which inputs and outputs signals from the field. Specifically, an output unit 23 drives the servomotor 30 based on the execution result of the program executed by the CPU unit 22, and an input unit 24 obtains an input signal from the sensor 40 which senses the servomotor 30.

Although not shown, the CPU unit 22 may have a part for performing input and output (such as a touch panel or a display). For example, information on the operation of the PLC may be provided to a user.

The master PLC 10 and the slaves 20 are connected via a network such as Ethernet (registered trademark). In the present embodiment, the master PLC 10 and the slaves 20 are configured to communicate using EtherCAT (registered trademark).

Different servomotors 30 are respectively connected to the plurality of slaves 20. Although FIG. 1 shows an example in which one servomotor 30 is connected to one slave 20, the number of motors connected to the slave 20 may also be plural. In the case where the number of motors connected to the slave 20 is plural, information on the driving of each servomotor 30 is unified by the slave and transmitted to the master PLC 10.

Moreover, although three slaves 20 are shown in FIG. 1, the number of slaves connected to the network is not limited.

<CPU Unit in Conventional Example>

Figure 2:
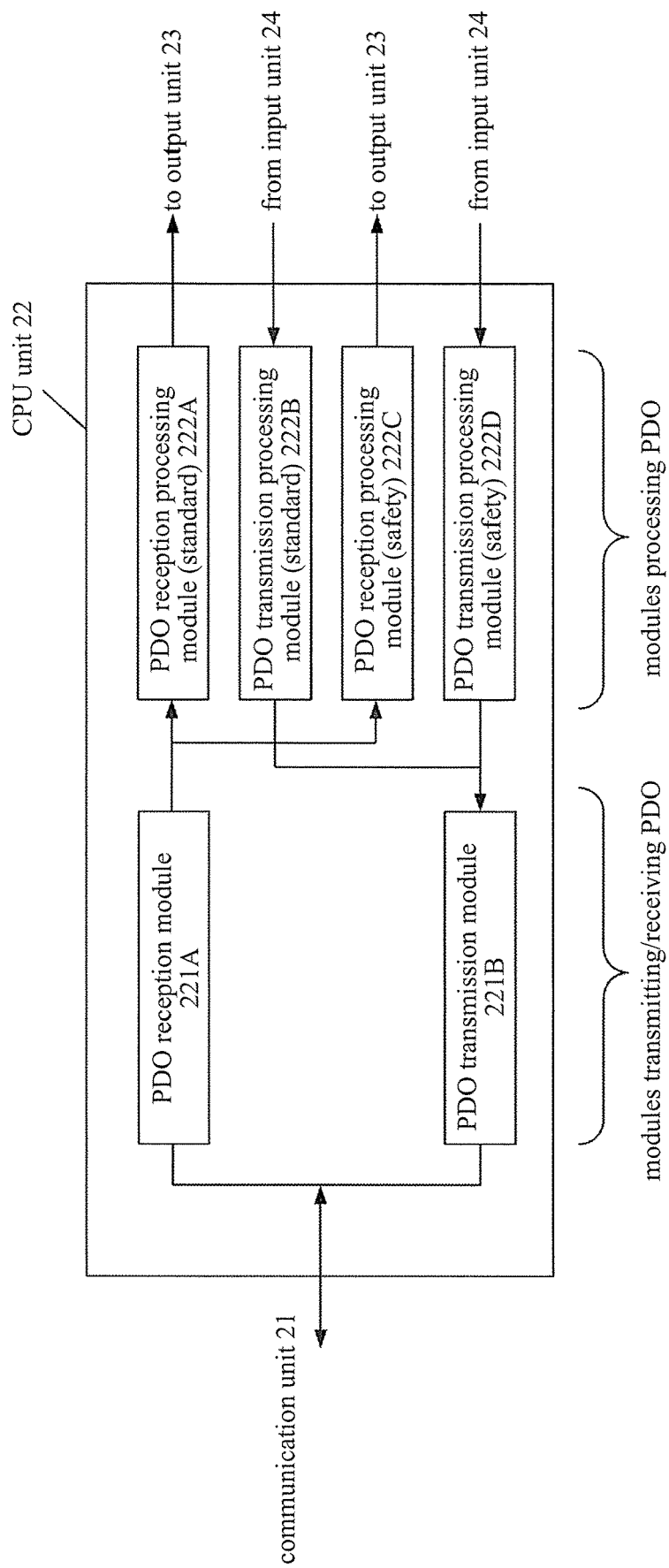
FIG. 2 is a module configuration view of a CPU unit 22 according to the conventional art.

Next, the module configuration of the CPU unit 22 will be described. FIG. 2 is a module configuration view of the CPU unit 22 in the conventional art.

Moreover, in the description of the present embodiment, only the modules that perform process data communication are shown, and illustration and description of the modules that perform mailbox communication are omitted.

The CPU unit 22 has a module that transmits and receives a PDO to and from the master PLC, and a module that processes the received PDO.

In this example, a PDO reception module 221A receives a PDO transmitted from the master PLC and divides the received PDO respectively into a standard PDO and a safety PDO.

Here, the standard PDO and the safety PDO will be described.

In the control system to which the invention is applicable, the master PLC and the slaves perform information exchange through PDO communication. The PDO communication is performed cyclically (periodically), and a PDO transmitted from the master PLC circulates in all the slaves. Moreover, in this example, the PDO transmitted from the master PLC includes, in the same one packet, a standard PDO in which information for performing control on the motor (e.g., position information, speed information, torque information, etc.) is stored, and a safety PDO in which information on security (e.g., FSoE command, emergency stop command, etc.) is stored.

Figures 3A, 3B, 3C:
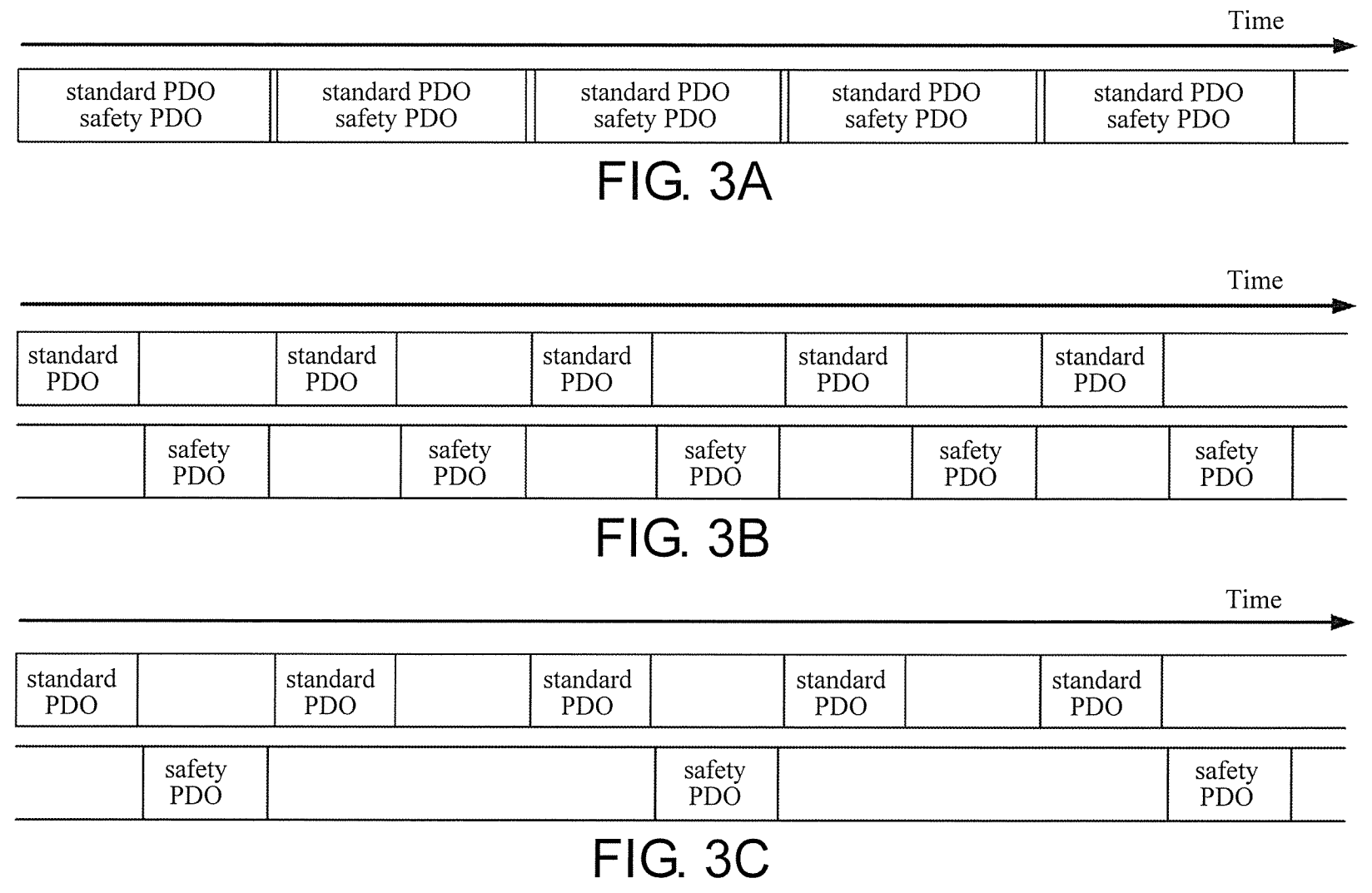

FIG. 3A is a view showing transmission of a PDO. As shown in the drawing, the PDO is transmitted periodically (e.g., in every few microseconds to every few milliseconds).

Referring back to FIG. 2, the description will be continued.

The PDO reception module 221A divides the received PDO into a standard PDO and a safety PDO, and transmits the standard PDO to a module (222A) that processes the standard PDO. Moreover, the safety PDO is transmitted to a module (222C) that processes the safety PDO. Each module performs predetermined processing according to the received PDO and generates a control signal to be output to the servomotor 30.

Further, the information obtained by the sensor 40 is obtained by a module (222B) that processes the standard PDO and a module (222D) that processes the safety PDO. Then, a PDO transmission module 221B generates information to be stored in the PDO, configures a packet, and transmits the packet to the network. As a result, the PDO transmitted from the master PLC 10 is relayed by each of the slaves and circulates in the network.

In the description of the embodiment, the modules (222A and 222B) that process the standard PDO are referred to as standard parts, and the modules (222C and 222D) that process the safety PDO are referred to as safety parts.

In addition, in such a configuration, there is an issue that the standard parts and the safety parts cannot be paused separately. For example, in the case where the modules 222A and 222B responsible for the standard parts are to be updated, transmission and reception of the standard PDO must be stopped. However, in the configuration in which the standard PDO and the safety PDO are integrally transmitted and received, once the standard parts are stopped, the communication of the standard PDO is stopped, which causes a watchdog (not shown) of the CPU unit 22 to detect a communication abnormality. Further, when a communication abnormality is detected, the operation of the entire device, including the safety parts, is stopped. Therefore, there is an issue that the security of the device cannot be sufficiently ensured. In addition, when the entire device is stopped, there is an issue that it takes time to restart.

<CPU Unit in the Present Embodiment>

Figure 4:
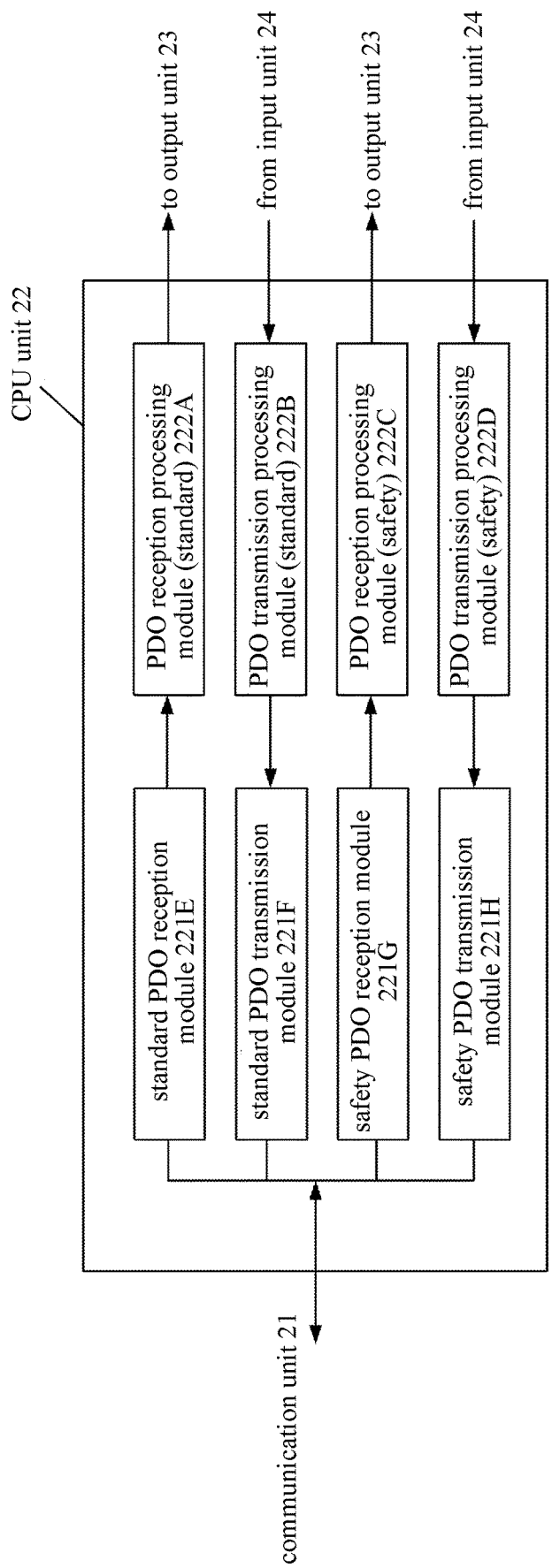
FIG. 4 is a module configuration view of a CPU unit 22 according to the first embodiment.

Next, the module configuration of the CPU unit 22 in the present embodiment will be described with reference to FIG. 4. The CPU unit 22 in the present embodiment has a module that receives a PDO from the network and a module that transmits the PDO to the network as in the conventional example, but has a feature that the module that transmits and receives the standard PDO and the module that transmits and receives the safety PDO are divided.

Specifically, a standard PDO reception module 221E performs reception of the standard PDO, and a standard PDO transmission module 221F performs transmission of the standard PDO. Moreover, a safety PDO reception module 221G performs reception of the safety PDO, and a safety PDO transmission module 221H performs transmission of the safety PDO.

The parts (222A to 222D) for processing reception of the PDO and transmission of the PDO are the same as in the conventional example.

Further, in the present embodiment, as shown in FIG. 3B, the standard PDO and the safety PDO are respectively transmitted and received by independent packets. In other words, the standard PDO reception module 221E and the standard PDO transmission module 221F perform transmission and reception operations by taking only the standard PDO as a target, and the safety PDO reception module 221G and the safety PDO transmission module 221H perform transmission and reception operations by taking only the safety PDO as a target.

Furthermore, in the present embodiment, a watchdog (not shown) operating in the CPU unit 22 has the following features.

(1) While the servomotor 30 is stopped, in the case where communication of both the standard PDO and the safety PDO is stopped, a communication abnormality event occurs.

(2) During operations of the servomotor 30, in the case where communication of the standard PDO is stopped, a communication abnormality event occurs.

In addition, the case where communication has stopped refers to the case where the modules 222A to 222D stop communication or input/output, but even in the case where communication or input/output is possible, if the modules 222A to 222D do not process the PDO normally, it is deemed that communication has stopped.

In the case where a communication abnormality event occurs, the CPU unit 22 stops the operation of the entire device as in the conventional configuration to thereby stop the motor.

According to such a configuration, it is possible to stop only one of the standard part and the safety part while the servomotor is stopped. In other words, while security remains ensured, maintainability can be further improved. As a result, it is possible to reduce the preparation time of restarting the device or the like.

During operation of the servomotor, if the communication with the standard part is stopped, a communication abnormality event occurs. This is similar to the conventional configuration.

Second Embodiment

The second embodiment is an embodiment in which, in addition to the first embodiment, the standard PDO and the safety PDO are respectively further configured to be transmitted and received in different cycles.

FIG. 3C is a view showing a communication sequence in the second embodiment. In the example as shown, the standard PDO is transmitted and received every two time slots, and the safety PDO is transmitted and received every four time slots. Accordingly, by making the communication cycle different between the standard PDO and the safety PDO, the processing load of the device and the load of the network can be optimally designed. During PDO communication, although the capacity of the message which can be communicated is determined in advance, by optimizing the arrangement of the safety PDO, the communication capacity for the standard part can be increased, for example.

(Modification Example)

In addition, the description of the embodiments is an example for describing the invention, and the invention may also be implemented by being appropriately changed or combined within the scope that does not deviate from the spirit of the invention.

For example, although the term "module" is used in the description of the CPU unit 22, the module may be a software module, or may be a specifically designed hardware (circuit or board) module or the like.

Moreover, although a system that controls a servomotor has been illustrated in the description of the embodiments, the control target may be a target other than the servomotor. For example, it may also be an inverter or the like. Further, the control target does not necessarily have to have a movable part. For example, it may also be a sensing device, a laser device, or the like.

What is claimed is:

1. A control device connected to a master device and performing controls of a drive target based on a content of communication with the master device, the control device comprising:
    a communication unit which periodically transmits and receives, to and from the master device, first information which is information on the controls of the drive target and second information which is information on security;
    a first processing unit which controls the drive target by processing the first information;
    a second processing unit which performs processing for ensuring security of the drive target by processing the second information; and
    an abnormality determining unit which detects an abnormality when both the first information and the second information are not processed normally within a prescribed period, wherein
    an operation of the drive target is stopped when the abnormality is detected,
    the first information and the second information are respectively transmitted and received by independent packets,
    the abnormality determining unit:
    detects the abnormality when the first information is not processed normally within the prescribed period while the drive target is being driven, and
    detects the abnormality when both the first information and the second information are not processed normally within the prescribed period while the drive target is not being driven.

2. The control device according to claim 1, wherein the first information and the second information are transmitted and received in different cycles.

3. The control device according to claim 2, wherein a transception cycle of the first information is shorter than a transception cycle of the second information.

4. A control method performed by a control device which is connected to a master device and performs controls of a drive target based on a content of communication with the master device, the control method comprising:
    a communication step of periodically transmitting and receiving, to and from the master device, first information which is information on the controls of the drive target and second information which is information on security;
    a first processing step of controlling the drive target by processing the first information;
    a second processing step of performing processing for ensuring security of the drive target by processing the second information; and
    an abnormality determining step of detecting an abnormality when both the first information and the second information are not processed normally within a prescribed period, wherein
    an operation of the drive target is stopped when the abnormality is detected,
    the first information and the second information are respectively transmitted and received by independent packets,
    the abnormality determining step comprises:
    detecting the abnormality when the first information is not processed normally within the prescribed period while the drive target is being driven, and
    detecting the abnormality when both the first information and the second information are not processed normally within the prescribed period while the drive target is not being driven.

5. A non-transient computer-readable recording medium that stores a program which causes a computer to implement the control method according to claim 4.

* * * * *